US011461170B2

(12) United States Patent
Eilert et al.

(10) Patent No.: US 11,461,170 B2
(45) Date of Patent: Oct. 4, 2022

(54) ERROR CACHING TECHNIQUES FOR IMPROVED ERROR CORRECTION IN A MEMORY DEVICE

(71) Applicant: Micron Technology, Inc., Boise, ID (US)

(72) Inventors: Sean S. Eilert, Penryn, CA (US); William A. Melton, Shingle Springs, CA (US); Justin Eno, El Dorado Hills, CA (US)

(73) Assignee: Micron Technology, Inc., Boise, ID (US)

( * ) Notice: Subject to any disclaimer, the term of this patent is extended or adjusted under 35 U.S.C. 154(b) by 98 days.

(21) Appl. No.: 16/993,956

(22) Filed: Aug. 14, 2020

(65) Prior Publication Data

US 2022/0050744 A1 Feb. 17, 2022

(51) Int. Cl.
*G11C 29/00* (2006.01)
*G06F 11/10* (2006.01)
*G06F 12/0875* (2016.01)

(52) U.S. Cl.
CPC ...... *G06F 11/1068* (2013.01); *G06F 12/0875* (2013.01); *G06F 2212/1032* (2013.01)

(58) Field of Classification Search
CPC ............. G06F 11/1068; G06F 12/0875; G06F 2212/1032
See application file for complete search history.

(56) References Cited

U.S. PATENT DOCUMENTS

2016/0170853 A1\* 6/2016 Lo ........................ G11C 29/76
714/6.22
2017/0091025 A1\* 3/2017 Ahn ..................... G06F 11/1048

\* cited by examiner

*Primary Examiner* — Samir W Rizk
(74) *Attorney, Agent, or Firm* — Holland & Hart LLP

(57) ABSTRACT

Methods, systems, and devices for error caching techniques for improved error correction in a memory device are described. An apparatus, such as a memory device, may use an error cache to store indications of memory cells identified as defective and may augment an error correction procedure using the stored indications. If one or more errors are detected in data read from the memory array, the apparatus may check the error cache, and if a bit of the data is indicated as being associated with a defective cell, the bit may be inverted. After such inversion, the data may be checked for errors again. If the inversion corrects an error, the resulting data may be error-free or may include a reduced quantity of errors that may be correctable using an error correction scheme.

25 Claims, 7 Drawing Sheets

ERROR CACHING TECHNIQUES FOR IMPROVED ERROR CORRECTION IN A MEMORY DEVICE

BACKGROUND

The following relates generally to one or more systems for memory and more specifically to error caching techniques for improved error correction in a memory device.

Memory devices are widely used to store information in various electronic devices such as computers, wireless communication devices, cameras, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read-only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
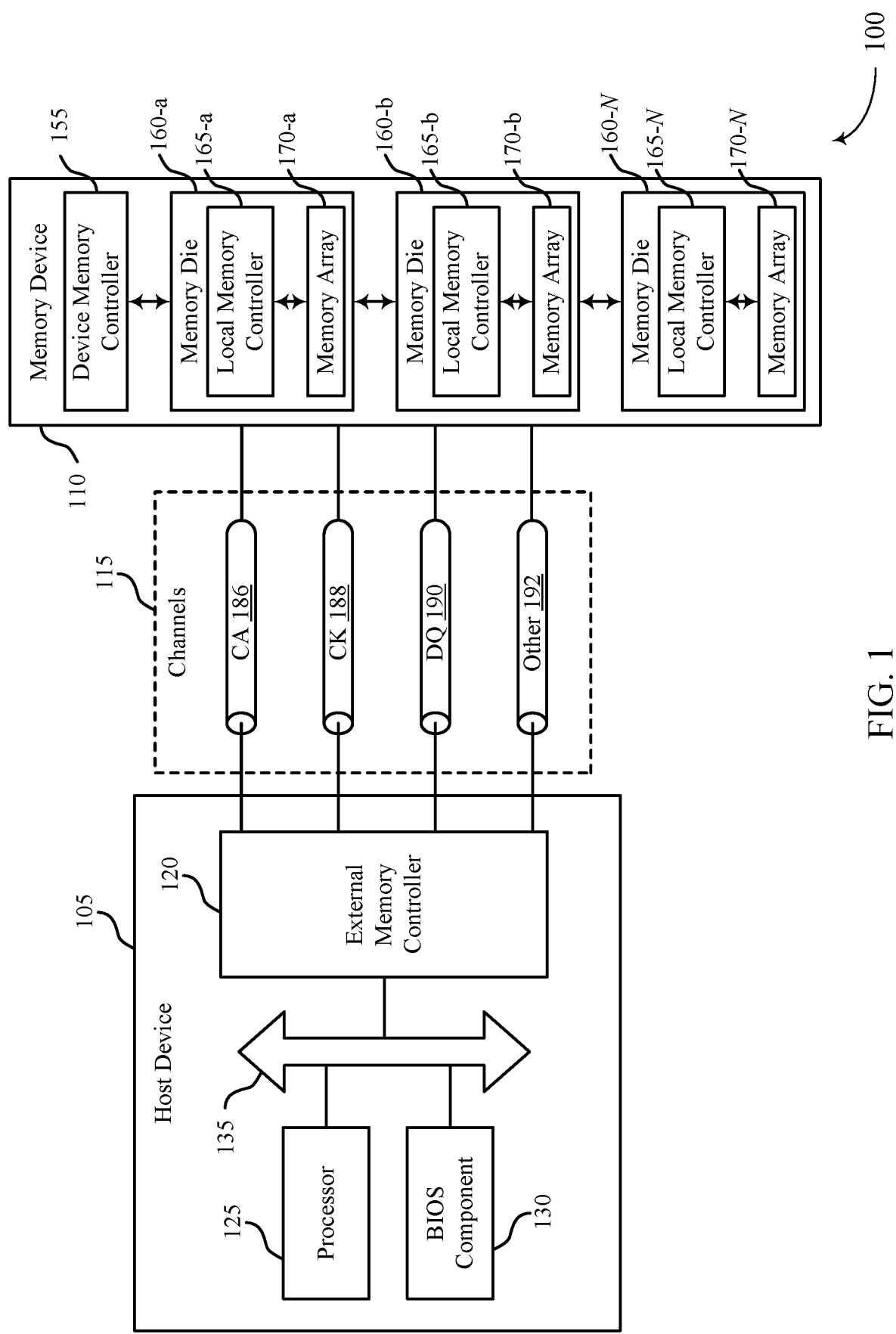
FIG. 1 illustrates an example of a system that supports error caching techniques for improved error correction in a memory device in accordance with examples as disclosed herein.

Some memory systems may utilize error detection or correction techniques, which may generally be referred to as error checking techniques, to detect or correct errors in data retrieved from a memory array. For example, error checking techniques may determine whether data was corrupted while stored in a memory array, and in some cases may attempt to correct detected errors. However, error checking techniques may be limited to detecting or correcting up to a certain quantity of errors (e.g., a single error correction (SEC) scheme may be able to detect and correct a single error in a set of data, a SEC double error detection (DED) scheme may be able to detect up to two errors and correct one error in a set of data, among other examples of error checking techniques). In some cases, data may include errors above the quantity of correctable or detectable errors for an error checking scheme (e.g., a SECDED scheme may be unable to detect or correct three errors in a set of data, among other examples of quantities and schemes).

The techniques described herein may utilize an error cache for error correction, which may result in relatively more robust error checking techniques, among other advantages. The error cache may include entries indicating locations of one or more defective memory cells of the memory array, and the memory device may perform one or more procedures for error correction using the error cache. For example, upon reading data from a memory array, the memory device may detect a quantity of errors in the data that the memory device is unable to correct using only parity information for the data (e.g., the memory device using a SECDED error checking scheme may detect two errors in the data, among other examples). In such examples, the memory device may determine whether the error cache includes an entry for the address of the data. If the error cache includes the entry, the memory device may select one or more bits of the data to invert based on the entry. For example, the memory device may identify that a bit of the data is associated with a defective memory cell based on an address associated with the data and a corresponding entry in the error cache. The memory device may invert the bit corresponding to the defective memory cell to obtain altered data. After such inversion, the memory device may then apply the error checking scheme to the altered data, which may enable the memory device to correct the data based on the associated parity information (e.g., if inverting the bit corrects one of the two detected errors, thus leaving only a single error, the memory device may be able to correct the remaining error using the SECDED scheme and output the corrected data).

Some errors associated with a memory array may be fixed (e.g., due to a memory cell being defective, such as being "stuck" storing a certain logic state), while other errors may be time-variant (e.g., due to transient conditions such as temperature or electromagnetic effects, such that an associated memory cell may not in fact be defective). The cache may be managed (e.g., populated and culled or otherwise have its entries maintained) so as to include indications of memory cells associated with fixed errors and cull or otherwise not include indications of memory cells associated with time-variant errors. For example, the error cache may include an indication of a defective memory cell for an address, but the memory device may determine there are no errors in one or more sets of data read from the address. In some such examples, the memory device may remove the indication from the cache, which may result in relatively efficient cache utilization and cull entries associated with time-variant errors, among other advantages.

Features of the disclosure are initially described in the context of systems and dies as described with reference to FIGS. 1 and 2. Features of the disclosure are described in the context of memory systems and process flows as described with reference to FIGS. 3 and 4. These and other features of the disclosure are further illustrated by and described with reference to an apparatus diagram and flowcharts that relate to error caching techniques for improved error correction in a memory device as described with reference to FIGS. 5-7.

FIG. 1 illustrates an example of a system 100 that supports error caching techniques for improved error correction in a memory device in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, a vehicle controller, a system on a chip (SoC), a graphics processing unit (GPU), or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or an SoC, among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of read-only memory (ROM), flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-*a*, local memory controller 165-*b*, local memory controller 165-N) and a memory array 170 (e.g., memory array 170-*a*, memory array 170-*b*, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may include circuits, logic, or components operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, signaling may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, bit errors may occur due to memory cell defects (e.g., from manufacturing flows, latent defects that occur after manufacturing, etc.). For example, a memory cell may include a defect resulting in a fixed error (e.g., a memory cell may be defective), or a detected error in a memory cell may be a time-variant error (e.g., a relatively functional memory cell may include an error relatively infrequently due to operating conditions or other random error occurrences).

An error checking technique may be able to detect or correct up to a certain quantity of errors in data written to and subsequently read from a memory array based on parity information generated for the data, which in some cases may also be stored in the memory array (e.g., in association with the corresponding data). For example, an SEC parity scheme may support detecting or correcting a single error in data based on the parity information for the data, a SECDED parity scheme may support detecting up to two errors and correcting a single error based on the parity information for the data, among other examples of error detection schemes). In some cases, data may include errors above the quantity of errors that may be corrected based on the associated parity information.

As described herein, a system 100 may implement an error cache for error correction, which may result in relatively more robust error checking techniques (e.g., an increase in the quantity of correctable errors relative to the quantity correctable based on parity information alone), among other advantages. For example, one or more components of the system 100 (e.g., a memory device 110, a host device 105, a device memory controller 155, a local memory controller 165, an external memory controller 120, or any combination thereof) may maintain an error cache in order to provide information for error correction to an error correction engine, as described with reference to FIG. 3.

The memory device 110 may perform one or more procedures for error correction using the error cache. For example, the memory device 110 may detect a quantity of errors in data read from a memory array but may be unable to correct the errors using parity information for the data (e.g., the memory device 110 may detect two errors in a SECDED scheme, among other examples). In such examples, the memory device 110 may determine whether the error cache includes an entry for the address of the data. If the error cache includes the entry, the memory device 110 may select one or more bits of the data to invert based on the entry. For example, the memory device 110 may identify a location of a defective memory cell within the address based on an indication written to the entry. The memory device 110 may invert the bit corresponding to the defective memory cell to obtain altered data. The memory device 110 may then be able to correct the altered data using the parity information for the data (e.g., if inverting the bit changes the two previously detected errors to a single error in a SECDED scheme, the memory device may be able to correct the error and output the corrected data). Thus, by keeping track of known error locations (e.g., defective memory cells) using the error cache, the error correction capability of an error correction scheme may be enhanced.

In some examples, the memory device 110 may update the error cache. For example, if the memory device 110 identifies data as error-free when the error cache includes an indication of a defective memory cell associated with the data, the memory device 110 may in some circumstances remove the indication from the cache, which may result in relatively efficient cache utilization and over time focus the cache entries on fixed errors, among other advantages.

Figure 2:
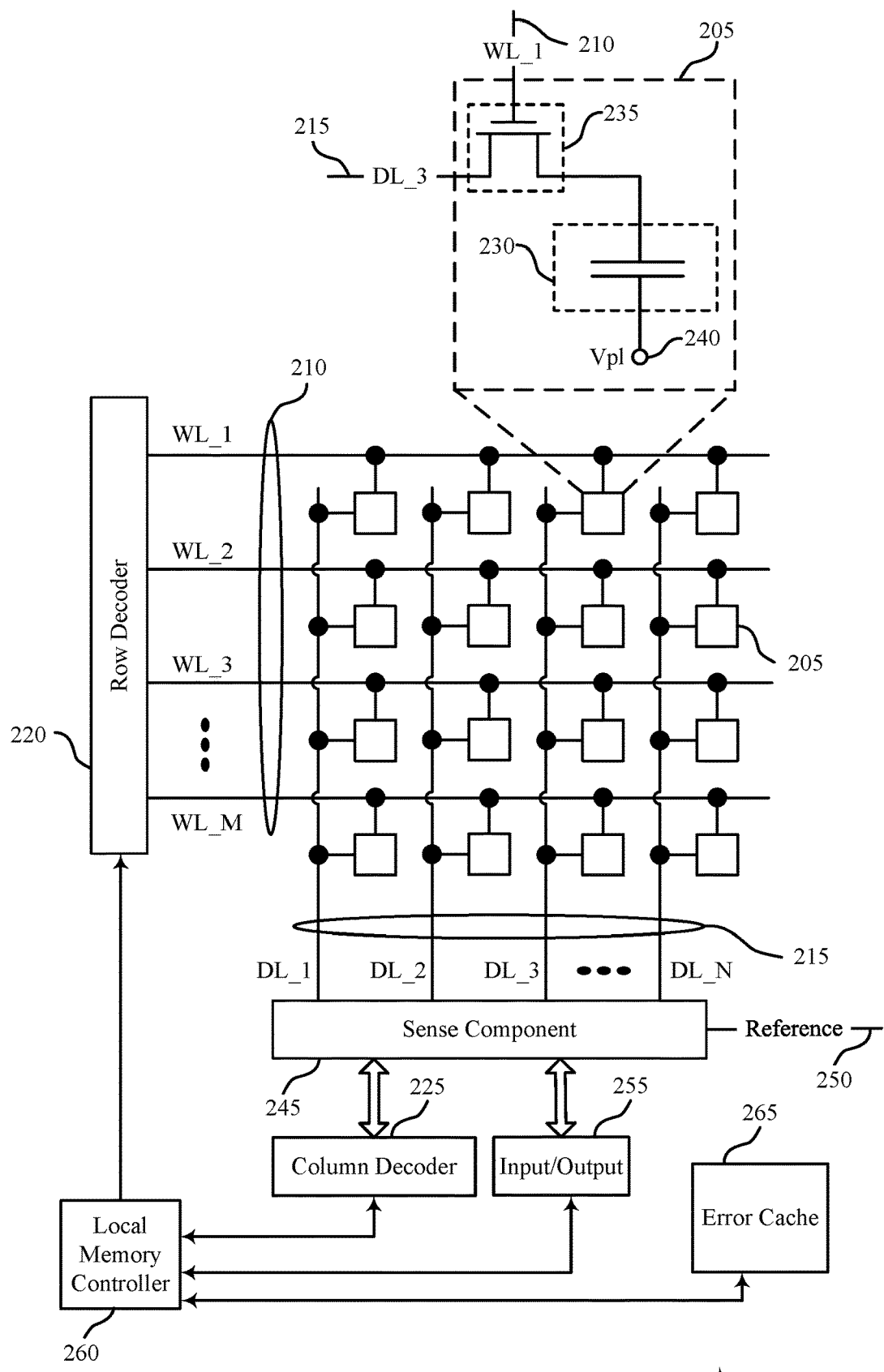
FIG. 2 illustrates an example of a memory die that supports error caching techniques for improved error correction in a memory device in accordance with examples as disclosed herein.

FIG. 2 illustrates an example of a memory die 200 that supports error caching techniques for improved error correction in a memory device in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., programmed to one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11). In some examples, the memory cells 205 may be arranged in an array, such as a memory array 170 described with reference to FIG. 1.

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230, and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. In some examples, access operations may be performed by or otherwise coordinated by the local memory controller 260 in response to various access commands (e.g., from a host device 105). The local memory controller 260 may be operable to perform other access operations not listed here or other operations related to the operating of the memory die 200 that are not directly related to accessing the memory cells 205.

The local memory controller 260 may be operable to perform a write operation (e.g., a programming operation) on one or more memory cells 205 of the memory die 200. During a write operation, a memory cell 205 of the memory die 200 may be programmed to store a desired logic state.

The local memory controller 260 may identify a target memory cell 205 on which to perform the write operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The local memory controller 260 may apply a specific signal (e.g., write pulse) to the digit line 215 during the write operation to store a specific state (e.g., charge) in the capacitor 230 of the memory cell 205. The pulse used as part of the write operation may include one or more voltage levels over a duration.

The local memory controller 260 may be operable to perform a read operation (e.g., a sense operation) on one or more memory cells 205 of the memory die 200. During a read operation, the logic state stored in a memory cell 205 of the memory die 200 may be determined. The local memory controller 260 may identify a target memory cell 205 on which to perform the read operation. The local memory controller 260 may identify a target word line 210 and a target digit line 215 coupled with the target memory cell 205 (e.g., the address of the target memory cell 205). The local memory controller 260 may activate the target word line 210 and the target digit line 215 (e.g., applying a voltage to the word line 210 or digit line 215) to access the target memory cell 205. The target memory cell 205 may transfer a signal to the sense component 245 in response to biasing the access lines. The sense component 245 may amplify the signal. The local memory controller 260 may activate the sense component 245 (e.g., latch the sense component) and thereby compare the signal received from the memory cell 205 to the reference 250. Based on that comparison, the sense component 245 may determine a logic state that is stored on the memory cell 205.

The local memory controller 260 and the memory die 200 may implement an error cache 265 to support error correction for data stored in and read from the memory array. The error cache 265 may be coupled with the local memory controller 260 as shown in FIG. 2. Alternatively, in some cases the error cache 265 may be coupled with the local memory controller 260. And in some cases (e.g., where memory cells 205 are non-volatile), the error cache 265 may be or include a portion of the memory array.

The local memory controller 260 (or another controller of the memory device 110 or a host device 105) may maintain (e.g., manage) the contents of the error cache 265 in order to provide information for error correction, as described with reference to FIG. 3, for example. The error cache 265 may be populated with one or more entries indicating locations of one or more defective memory cells of the memory die 200. For example, the local memory controller 260 may identify an error in data associated with an address, and the local memory controller 260 may write the location of the identified the error cache 265 based at least in part on identifying the error. For example, the local memory controller 260 may store an address (e.g., a physical address) for one or more memory cells from which the data was read, possibly along with an offset parameter indicating the location of a memory cell within a set of memory cells associated with the address, where the memory cell is associate with the detected error.

The local memory controller 260 may perform one or more procedures for error correction using information stored in the error cache 265. For example, error checking logic (e.g., within the memory die 200) may detect a quantity of errors in data read from the memory array but may be unable to correct the errors using parity information for the data (e.g., the local memory controller 260 may detect two errors in a SECDED scheme, among other examples). The error checking logic may be or include an error correction engine 315 as described with reference to FIG. 3. In such examples, the local memory controller 260 may determine whether the error cache 265 includes an entry for an address associated with the data. If the error cache 265 includes such an entry, the local memory controller 260 may select one or more bits of the data to invert based on the entry. For example, the local memory controller 260 may identify a location of a defective memory cell based on an indication written to the entry. The local memory controller 260 may invert a bit corresponding to the defective memory cell to obtain altered data. The local memory controller 260 may input the altered data into the error checking logic, which may then be able to correct the data based on the associated parity information (e.g., if inverting the bit changes the two detected errors to a single error in a SECDED scheme, the memory device may be enabled to correct the error and output the corrected data).

In some examples, the local memory controller 260 may update the error cache 265. For example, the local memory controller 260 may fail to identify errors in data associated with an address, where the error cache 265 includes an indication of a defective memory cell for the address. In at least some such circumstances, the local memory controller 260 may remove the indication from the error cache 265, which may result in relatively efficient cache utilization, among other advantages.

Figure 3:
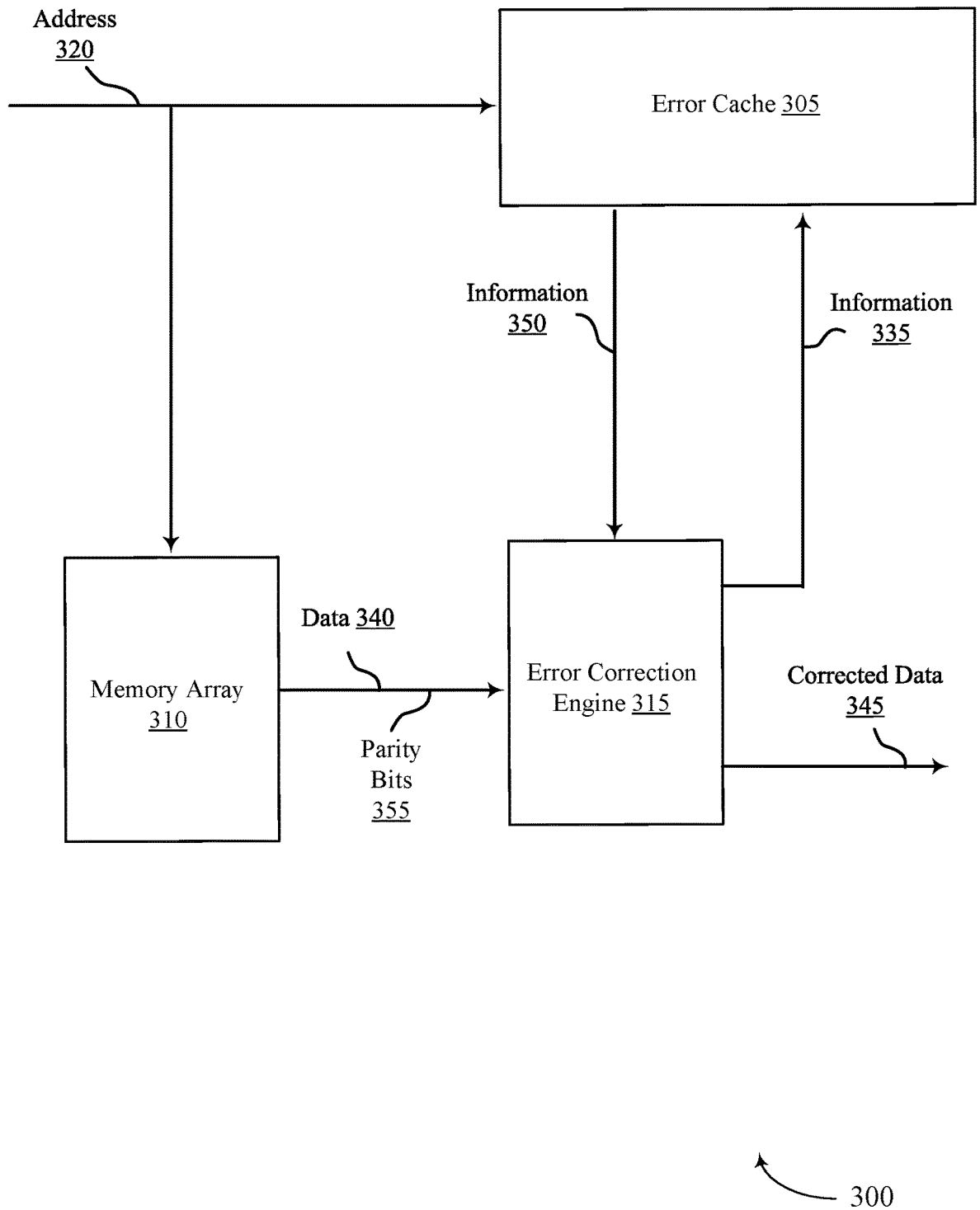
FIG. 3 illustrates an example of a system that supports error caching techniques for improved error correction in a memory device in accordance with examples as disclosed herein.

FIG. 3 illustrates an example of a system 300 that supports error caching techniques for improved error correction in a memory device in accordance with examples as disclosed herein. The system 300 may be an example of aspects of a system 100 or a memory device 110 as described with reference to FIGS. 1 and 2, respectively.

The system 300 may include a memory array 310, which may be an example of a memory array 170. The system 300 may also include error cache 305 and error correction engine 315. The system 300 may be configured to perform one or more error checking procedures using the error correction engine 315 and the error cache 305, which may reduce the chance of errors in communications (e.g., transmitting corrupted data from the memory array 310). Generally, the components shown in FIG. 3 may implement the procedures and operations described herein related to error checking, although it is to be understood that there may be more or less components than shown that implement the procedures. Additionally or alternatively, although illustrated as separate for illustrative clarity, the various components described herein may be combined or physically located differently than illustrated.

The error cache 305 may maintain a list of memory cells associated with previously detected errors (e.g., defective memory cells). For example, the system 300 may keep track of a list of known "stuck-at" bits (e.g., memory cells that store a same logic state regardless of which logic state was written to the memory cells). In some examples, the list may be generated based on error correction code results or from testing done during one or more maintenance cycles, such as refresh cycles (e.g., the system 300 may perform a diagnostic procedure for the memory device during a refresh or other opportune period and the error cache 305 may be populated based on the results of the procedure). In some examples, information may be loaded to the error cache 305 upon powerup (e.g., in NVM, the list may be loaded to content addressable memory (CAM) or static RAM on powerup of the memory device).

The system 300 may receive a command, for example, from a host device. The command may indicate an address 320 associated with data (e.g., a logical address associated with the data or a physical address associated with a set of memory cells within the memory array 310 for writing or reading the data).

When a received command is a write command, the system 300 may store the data in the memory array 310. In some cases, the system 300 may also check the error cache 305, and if the error cache 305 includes one or more entries for the address 320 (e.g., an entry indicating a state in which a memory cell is "stuck"), the system 300 may write data to the memory array 310 such that a bit stored to the stuck memory cell aligns with the stuck state of the memory cell (e.g., if a memory cell is stuck at a logic state of "1," the system 300 may write the data such that a bit with a value of "1" is stored at the indicated location of the stuck memory cell), among other examples. For example, the system 300 may invert the data and also store any associated inversion flag in the memory array 310 or the error cache 305.

When a received command is a read command, a controller of the system 300 may perform a read operation to retrieve corresponding data 340 from the indicated address 320 of the memory array 310. In some examples, the system 300 may also read parity information for the data 340 (e.g., parity bits 355 previously generated based on the data 340) from the memory array 310. Additionally or alternatively, the system 300 may read some or all of the parity bits 355 from the error cache 305.

The system 300 may perform error checking using the error correction engine 315 (e.g., based on a parity scheme associated with the error correction engine, such an SEC parity scheme or a SECDED parity scheme). For example, in response to a read command for the data 340, the error correction engine 315 may receive the data 340 and the parity bits 355 associated with the data 340. The error correction engine 315 may perform a procedure to detect or correct errors in the data 340 in using the parity bits 355.

In some cases, the error correction engine may fail to identify errors in the data 340. For example, the data 340 may be free of errors or a quantity of errors may exceed a detection capability of the error correction scheme (e.g., three or more errors in a SECDED scheme may result in valid codewords, and the error correction engine 315 may fail to identify errors in the data 340). In some other cases, the error correction engine 315 may identify a correctable quantity of one or more errors in the data 340 and may correct the one or more errors to obtain corresponding corrected data 345. For example, the error correction engine 315 may identify a single error in a SEC or SECDED scheme and may correct the single error (e.g., flip a bit from a first logic state to a correct second logic state, the flipped bit identified using the parity bits 355) before outputting the corrected data 345, for example, to a host device requesting the data.

In some cases, the error correction engine 315 may compare a quantity of detected errors to a threshold and determine whether the threshold is satisfied. If the threshold is satisfied, the error correction engine 315 may be unable to correct the detected errors (e.g., the error correction engine 315 may detect two errors in a SECDED error correction scheme, but may be unable to correct the two errors). The threshold may be any quantity (e.g., 1 or greater). Based on the threshold being satisfied, the system 300 may query the error cache 305 to determine whether the error cache 305 includes an entry for the address 320.

In response to the query, the error cache 305 may send information 350 to the error correction engine 315. The information 350 may include error correction information which may enable the error correction engine 315 to correct the quantity of errors. As an illustrative example, the information 350 stored in the error cache 305 may include an indication of the address 320, an indication of a location of one or more defective memory cells of the set of memory cells associated with the address 320 in the memory array 310 (e.g., an offset parameter indicating a position of a defective memory cell within the address 320), an error count for the defective memory cell, metadata associated with the memory cell, or any combination thereof.

The system 300 may identify one or more defective memory cells based on the information 350 (e.g., the information 350 may indicate the location of one or more defective memory cells in the address 320 storing the data 340). The system 300 may change a value of one or more bits associated with the one or more defective memory cells. For example, the error correction engine 315 may invert a value of a bit associated with a defective memory cell (e.g., from 0 to 1 or from 1 to 0) to obtain altered data (e.g., the data 340 with the one or more bits read from the one or more defective memory cells being inverted). The altered data may be input to the error correction engine 315 (or alternatively a second error correction engine, possibly based on a different parity scheme) for a second error checking procedure. By changing (e.g., inverting) the bits associated with the one or more defective memory cells in accordance with the indications stored in the error cache 305, the error correction engine 315 may be enabled to correct the errors in the data 340 based on correcting a reduced quantity of errors in the corresponding altered data. As an illustrative example, if the error correction engine 315 detects two errors in a SECDED scheme, one or both of the errors may be corrected by inverting one or both bits associated with the defective memory cell indications stored in the error cache 305 (e.g., a single error may be corrected by the bit inversion, and the error correction engine 315 may use the parity bits 355 to identify and correct the remaining error). The error correction engine 315 may output the corrected data 345 after correcting one or more errors in the altered data or determining that the altered data is error free.

The system 300 may maintain the error cache 305. For example, the system 300 may employ methods for testing cached error locations and continuously updating (e.g., adding or culling) the list of "bad" locations (e.g., defective memory cells), which may increase the efficiency of the error cache 305. The error correction engine 315 may determine one or more results of one or more error correction or detection procedures. The error correction engine 315 may send information 335 indicating the one or more results. In one illustrative example, the error correction engine 315 may fail to identify errors in the data 340. If the error cache 305 includes an entry for the address 320 (e.g., an indication of a defective memory cell in a set of memory cells associated with the address 320), the information 335 may indicate to remove the entry based on failing to identify an error. Such removal may result in more efficient cache utilization and remove entries of the error cache 305 that may not be a result of a fixed error (e.g., the indication of the defective memory cell may be stored previously based on identifying a time-variant error), which may reduce the chance of incorrectly inverting bits for subsequent error procedures.

In some examples, the system 300 may remove an indication from the error cache 305 based on one or more thresholds. For example, the system 300 may increment a counter or otherwise track a quantity of times (e.g., consecutive times) that no errors are detected for a memory cell indicated by the error cache 305 as defective. If the quantity of times that no errors are detected satisfies a threshold, the system 300 may remove the entry of the error cache corresponding to the memory cell. By updating the error cache 305 based on satisfying the threshold, the system 300 may cull entries of the error cache that may be associated with a time-variant error while avoiding culling entries based on coincidental error-free determinations (e.g., if a defective memory cell happens to be stuck in a state corresponding to a logic value written to the memory cell).

As another illustrative example, the error correction engine 315 may identify an error in the data 340 that is associated with a specific memory cell. If the error cache 305 lacks an entry for the address 320, the information 335 may indicate to write an entry in the error cache 305 for the address 320, or an indication that the specific memory cell is defective if an entry for the address 320 exists but lacks an indication for the specific memory cell. In some cases, if the error cache 305 already includes an entry for the address 320, the information 335 may indicate to increment an error count associated with the memory cell based on identifying the memory cell as associated with the error. Writing, to the error cache 305, an indication that the specific memory cell is defective (e.g., so as to determine bit inversion in response to subsequent reads from the memory cell) may be based on the incremented error count satisfying a threshold. By tracking error counts for memory cells using the error cache 305 and generating an indication that the memory cell is defective based on the error count for the memory cell satisfying a threshold, the system 300 may reduce a chance of adding a memory cell with a time-variant error to the error cache 305 (e.g., the threshold may help ensure that the error cache 305 includes memory cells with fixed defects, among other examples).

Figure 4:
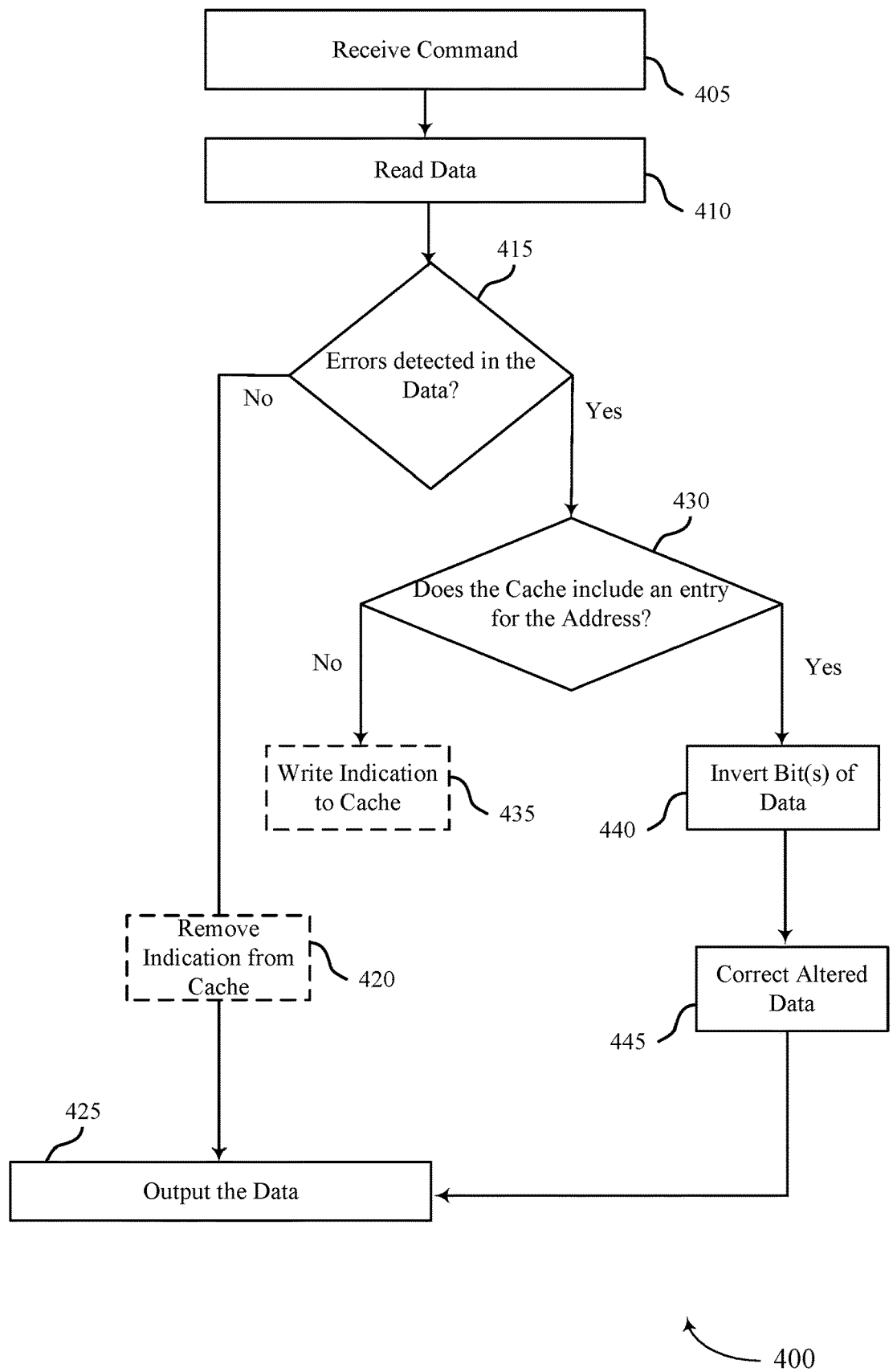
FIG. 4 illustrates an example of a process flow that supports error caching techniques for improved error correction in a memory device in accordance with examples as disclosed herein.

FIG. 4 illustrates an example of a process flow 400 that supports error caching techniques for improved error correction in a memory device in accordance with examples as disclosed herein. The process flow may be an example of operations performed by a system 100, a memory device 110, or a system 300 as described with reference to FIGS. 1-3, respectively. Generally, the operations shown in FIG. 4 may illustrate procedures and operations of a memory device (or a memory system) to perform error correction procedures using an error cache, although it is to be understood that there may be more or less operations than shown. Additionally or alternatively, operations may be added, removed, or performed in a different order than shown in FIG. 4.

At 405, the memory device may receive a command. For example, the memory device may receive a read command from a host device. The command may indicate an address (e.g., a logical or physical address) for data that is to be read from a memory array within the memory device.

The memory device may apply the address (e.g., as received or based on a logical-to-physical mapping to obtain a physical address) to a memory array and an error cache of the memory device (e.g., a memory array 310 and an error cache 305 as described with reference to FIG. 3). For example, if the command received at 405 is a read command, at 410 the memory device may read data from the memory array based on the address indicated by the command. In some examples, the memory device may also read parity bits associated with the data from the memory array. The memory device may also use the address to search the error cache for an entry associated with the address (e.g., the memory device may determine whether the cache includes an entry for the indicated address or for an address mapped to the indicated address). For example, the memory device may query the error cache concurrent (e.g., in parallel) with reading the data and performing a first error checking procedure for the data using the parity bits. That is, a time period to search the error cache and provide any cached information for the address (e.g., apply a query to the error cache and return a result to an error correction engine) may be allocated such that the cached information is available to the error correction engine before completion of the first error checking procedure for the raw data.

At 415, the memory device may determine whether any errors are detected in the data. For example, the memory device may input the data and associated parity bits into the error correction engine as part of a first procedure. The memory device may use the parity bits to determine whether there are one or more errors in the data.

In some examples, the memory device may detect no errors in the data. For example, the data may be free of errors or a quantity of errors may exceed a detection capability of the parity scheme associated with the parity bits (e.g., a SECDED scheme may fail to identify three or more errors in the data). At 425, based on the result of the error checking procedure indicating that the data is free of errors, the memory device may output the data. In some examples, the memory device may perform one or more operations for the error cache based on failing to detect errors in the data. For example, the memory device may determine that an error cache includes an entry for the address (e.g., a previous procedure result indicated that a memory cell in the address stored an erroneous data state and the error cache was updated with the location of the memory cell). At 420, the memory device may remove the indication from the cache based on failing to detect errors in the data (e.g., based on a count of error-free reads for a memory cell or an address satisfying a threshold). For example, an indication of a defective memory cell may have been stored based on a previous error checking procedure but due to a time-variant error (e.g., a single occurrence of an error in a non-defective memory cell). Removing the indication from the cache if no errors are detected may free up the cache to store information associated with other defective memory cells, may improve cache utilization and search speeds, and reduce the chance of incorrectly inverting a bit for a functional memory cell, among other advantages.

In some examples, the memory device may identify a correctable quantity of errors and may correct the raw data accordingly. For example, an error correction engine may identify a single error in a SEC or SECDED scheme and may correct the single error (e.g., flip a bit from a first logic state to a correct second logic state) before outputting the corrected data at 425, for example, to a host device requesting the data.

In some examples, the memory device may detect one or more errors in the data using the parity bits but may be unable to correct the errors using the parity bits. For example, the memory device may compare a quantity of detected errors in the data to a threshold and determine whether the threshold is satisfied. If the threshold is satisfied, the memory device may detect the errors but may be unable to correct the detected errors using the parity bits (e.g., the memory device may detect two errors in a SECDED error correction scheme, but may be unable to correct the two errors).

At 430, the memory device may determine whether the error cache includes an entry for the address indicated by the command, which may enable the memory device to correct the data using information in the error cache, among other advantages. For example, the memory device may search the error cache using the address to identify whether the error cache includes an indication of one or more defective memory cells within the set of memory cells from which the data was read. The entry may include an indication of the address, an indication of a location of one or more defective memory cells within the associated set of memory cells (e.g., an offset parameter indicating a position of a defective memory cell within the address or a corresponding physical address), an error count for the defective memory cell, metadata associated with the memory cell, or any combination thereof.

If the cache includes an entry for the address, at 440 the memory device may invert or otherwise alter one or more bits of the data. For example, the memory device may identify a location of a defective memory cell of the set of memory cells using the information in the error cache. The memory device may "flip" the bit associated with the defective memory cell (e.g., alter the data such that the bit read from the indicated memory cell has a different logic value than the logic value read from the memory cell).

At 445, the memory device may correct the altered data. For example, the memory device may input the altered data to the error correction engine and perform a second error checking procedure using the altered data and the parity bits. By flipping the one or more bits (e.g., a single bit inverted based on an indication of an associated memory cell) the memory device may reduce the quantity of errors such that the memory device can correct the altered data based on the parity bits (e.g., two detectable errors may be reduced to one correctable error by inverting a bit in a SECDED scheme, among other examples of quantities and schemes). After correcting the data, or obtaining a result of the second procedure indicating that the altered data does not include errors, the memory device may output the data at 425.

In some other examples, the memory device may determine at 430 that the cache fails to include an entry for the address despite detecting an error at 415. In such examples, the memory device may proceed to 435. At 435, the memory device may update the error cache to add or update an entry for the associated address and indication of the memory cell that included the error. By dynamically updating the cache based on detecting errors, the memory device may track memory cells that are defective, which may enhance the robustness of error correction procedures (e.g., the error cache may enable the memory device to convert a detectable quantity of errors to a correctable quantity of errors, among other examples).

Figure 5:
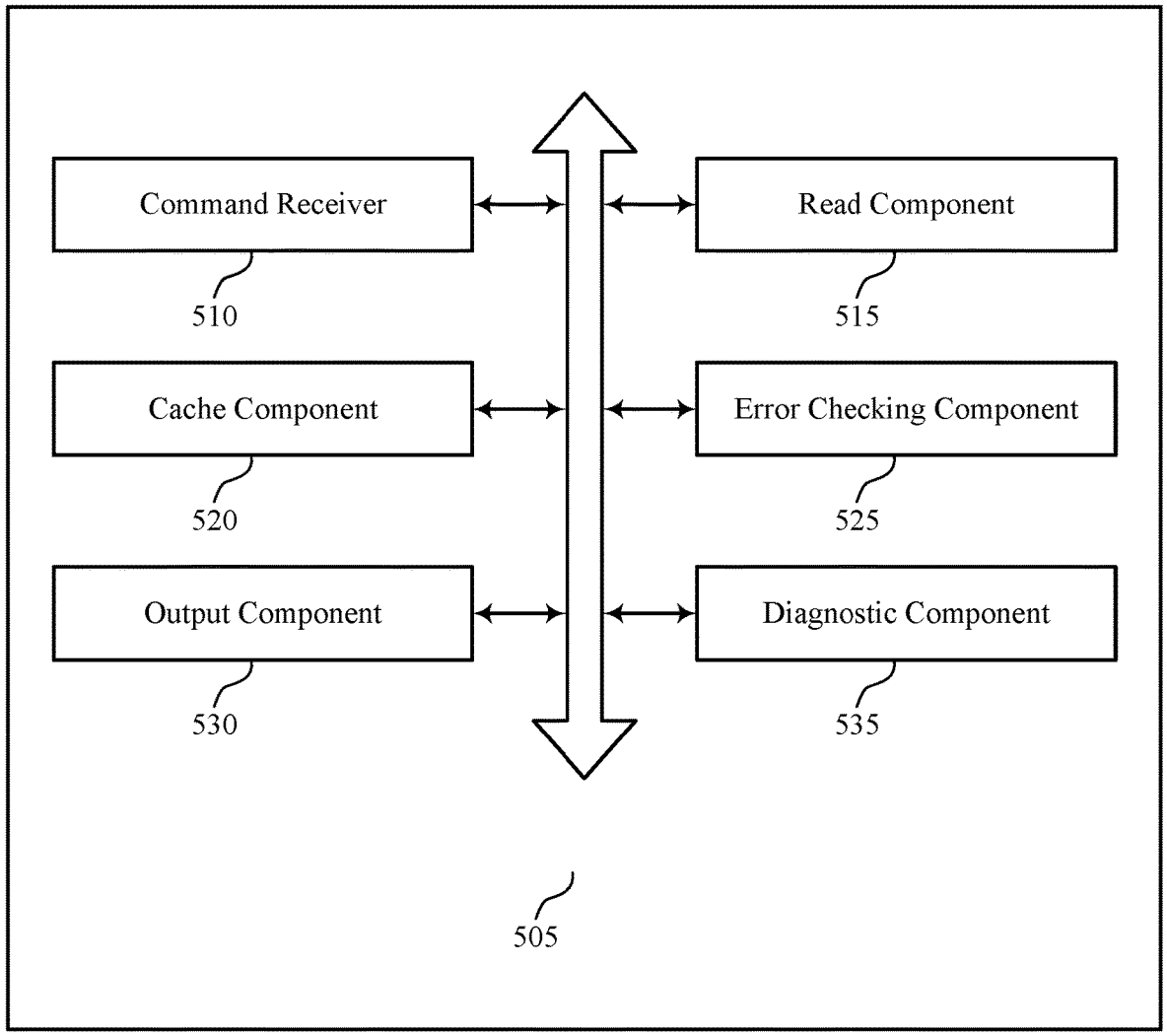
FIG. 5 shows a block diagram of a memory device that supports error caching techniques for improved error correction in a memory device in accordance with aspects of the present disclosure.

FIG. 5 shows a block diagram 500 of a memory device 505 that supports error caching techniques for improved error correction in a memory device in accordance with examples as disclosed herein. The memory device 505 may be an example of aspects of a memory device as described with reference to FIGS. 1-4. The memory device 505 may include a command receiver 510, a read component 515, a cache component 520, an error checking component 525, an output component 530, and a diagnostic component 535. Each of these modules may communicate, directly or indirectly, with one another (e.g., via one or more buses).

The command receiver 510 may receive a command to read data from a memory array, the command indicating an address associated with a set of memory cells within the memory array. The read component 515 may read, in response to the command, the data from the set of memory cells. The cache component 520 may determine, based on the indicated address, whether a cache includes an indication that a memory cell of the set of memory cells is defective. The error checking component 525 may perform, for the data, a procedure for error correction that is based on whether the cache includes the indication.

In some examples, the cache component 520 may determine that the cache includes the indication. In such examples, to perform the procedure for error correction, the error checking component 525 may determine that the data includes one or more errors based on the data and parity information associated with the data, invert, based on the indication that the memory cell is defective and determining that the data includes the one or more errors, a bit associated with the memory cell to obtain altered data, and determine, after inverting the bit, whether the altered data includes a second set of one or more errors based on the altered data and the parity information.

In some cases, the error checking component 525 may correct, after inverting the bit, the second set of one or more errors based on the altered data and the parity information to obtain corrected data.

The output component 530 may output, by a memory device that includes the memory array, the corrected data in response to the command.

In some examples, the error checking component 525 may determine that a quantity of errors included in the one or more errors satisfies a threshold, where inverting the bit is based on determining that the quantity of errors satisfies the threshold.

In some examples, the error checking component 525 may input the data and the parity information to error checking logic, where determining that the data includes one or more errors is based on inputting the data and the parity information to the error checking logic. In some examples, the error checking component 525 may input, after inverting the bit, the altered data and the parity information to the error checking logic, where determining whether the altered data includes a second set of one or more errors is based on inputting the altered data and the parity information to the error checking logic.

In some examples, the error checking component 525 may determine, based at least in part on the procedure for error correction, that the data includes an error. The cache component 520 may identify, among the set of memory cells, a respective memory cell associated with the error. The cache component 520 may write, to the cache, the indication that the respective memory cell is defective based at least in part on determining that the data includes the error.

In some examples, the diagnostic component 535 may perform, prior to receiving the command, a diagnostic procedure for the memory array. In some examples, the cache component 520 may write, to the cache, the indication that the memory cell is defective based on the diagnostic procedure.

In some examples, the cache component 520 may determine that the cache includes the indication that the memory cell is defective, and the error checking component 525 may determine, based on the procedure for error correction, that no error is detected for the data. In some examples, the cache component 520 may remove the indication from the cache based on determining that no error is detected for the data.

The command receiver 510 may receive a command to read data from a memory array, the command indicating an address associated with a set of memory cells within the memory array. The read component 515 may read, in response to the command, the data from the set of memory cells. In some examples, the error checking component 525 may determine, based on reading the data from the set of memory cells, that the data includes an error. In some examples, the error checking component 525 may identify, among the set of memory cells, a memory cell associated with the error. The cache component 520 may write, to a cache, an indication that the memory cell is defective based on determining that the data includes the error.

The cache component 520 may increment an error count associated with the memory cell based on identifying the memory cell as associated with the error, where writing the indication to the cache is based on the incremented error count satisfying a threshold.

In some examples, the command receiver 510 may receive a second command to read second data from the set of memory cells. In some examples, the cache component 520 may determine, in response to the second command, that the cache includes the indication that the memory cell is defective. In some examples, the error checking component 525 may perform, for the second data, a procedure for error correction that is based on the cache including the indication.

In some examples, to perform the procedure for error correction, the error checking component 525 may determine that the second data includes one or more errors based at least in part on parity information for the second data. The error checking component 525 may invert, based on determining that the second data includes the one or more errors, a bit associated with the memory cell to obtain altered data. The error checking component 525 may correct, after the inverting and based at least in part on the parity information, one or more errors in the altered data to obtain corrected data.

The output component 530 may output, by a memory device that includes the memory array, the corrected data in response to the second command.

In some examples, the error checking component 525 may input the second data and the parity information to error checking logic, where determining that the second data includes the one or more errors is based on inputting the second data and the parity information to the error checking logic. In some examples, the error checking component 525 may input, after the inverting, the altered data and the parity information to the error checking logic, where correcting the one or more errors in the altered data is based at least in part on inputting the altered data and the parity information to the error checking logic.

In some examples, the error checking component 525 may determine, based on the procedure for error correction, that no error is detected for the second data. In some examples, the cache component 520 may remove the indication from the cache based on determining that no error is detected for the data.

In some cases, the cache includes a second memory array, a portion of the memory array, or a combination thereof.

In some cases, where the cache includes an entry for the indicated address, the entry may include the indication that the memory cell is defective, and the entry may include an address for the memory cell, an offset for the indicated address associated with the memory cell, an error count for the memory cell, metadata associated with the memory cell, or any combination thereof.

Figure 6:
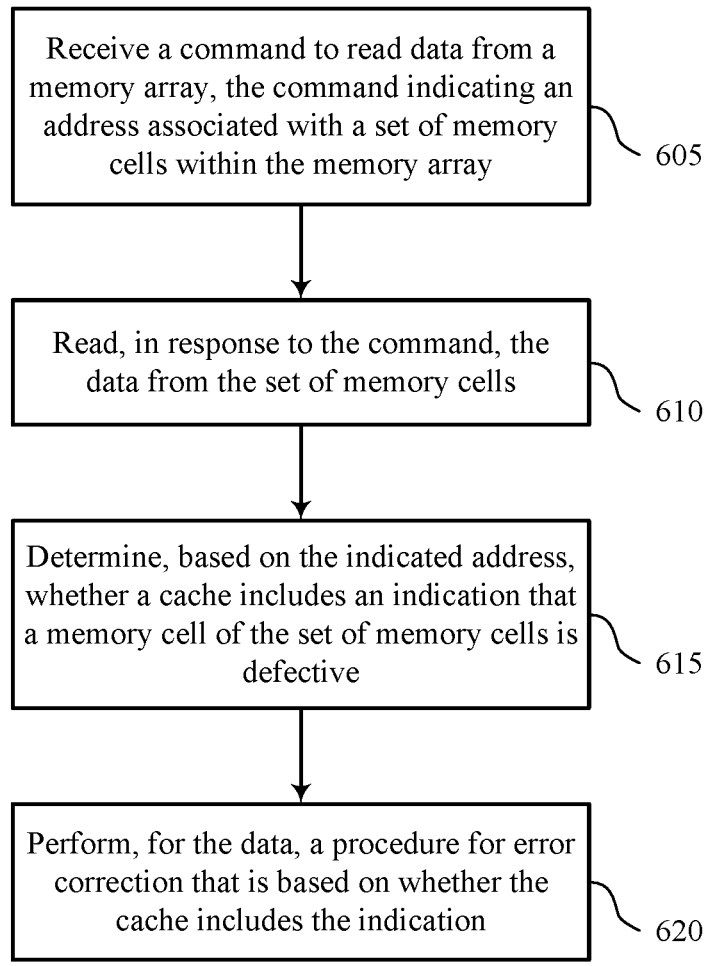
FIGS. 6 and 7 show flowcharts illustrating a method or methods that support error caching techniques for improved error correction in a memory device in accordance with examples as disclosed herein.

FIG. 6 shows a flowchart illustrating a method or methods 600 that supports error caching techniques for improved error correction in a memory device in accordance with aspects of the present disclosure. The operations of method 600 may be implemented by a memory device or its components as described with reference to FIGS. 1-5. For example, the operations of method 600 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 605, the memory device may receive a command to read data from a memory array, the command indicating an address associated with a set of memory cells within the memory array. The operations of 605 may be performed according to the methods described herein. In some examples, aspects of the operations of 605 may be performed by a command receiver as described with reference to FIG. 5.

At 610, the memory device may read, in response to the command, the data from the set of memory cells. The operations of 610 may be performed according to the methods described herein. In some examples, aspects of the operations of 610 may be performed by a read component as described with reference to FIG. 5.

At 615, the memory device may determine, based on the indicated address, whether a cache includes an indication that a memory cell of the set of memory cells is defective. The operations of 615 may be performed according to the methods described herein. In some examples, aspects of the operations of 615 may be performed by a cache component as described with reference to FIG. 5.

At 620, the memory device may perform, for the data, a procedure for error correction that is based on whether the cache includes the indication. The operations of 620 may be performed according to the methods described herein. In some examples, aspects of the operations of 620 may be performed by an error checking component as described with reference to FIG. 5.

In some examples, an apparatus as described with reference to FIGS. 1-5 may perform a method or methods, such as the method 600. The apparatus may include features, means, or instructions (e.g., a non-transitory computer-readable medium storing instructions executable by a processor) for receiving a command to read data from a memory array, the command indicating an address associated with a set of memory cells within the memory array, reading, in response to the command, the data from the set of memory cells, determining, based on the indicated address, whether a cache includes an indication that a memory cell of the set of memory cells is defective, and performing, for the data, a procedure for error correction that is based on whether the cache includes the indication.

Some examples of the method 600 and the apparatus described herein may further include operations, features, means, or instructions for determining that the cache includes the indication, where performing the procedure for error correction includes determining that the data includes one or more errors based on the data and parity information associated with the data, inverting, based on the indication that the memory cell is defective and determining that the data includes the one or more errors, a bit associated with the memory cell to obtain altered data, and determining, after inverting the bit, whether the altered data includes a second set of one or more errors based at least in part on the altered data and the parity information.

Some examples of the method 600 and the apparatus described herein may further include operations, features, means, or instructions for correcting, after inverting the bit, the second set of one or more errors based on the altered data and the parity information to obtain corrected data.

Some examples of the method 600 and the apparatus described herein may further include operations, features, means, or instructions for outputting, by a memory device that includes the memory array, the corrected data in response to the command.

Some examples of the method 600 and the apparatus described herein may further include operations, features, means, or instructions for determining that a quantity of errors included in the one or more errors satisfies a threshold, where inverting the bit may be based on determining that the quantity of errors satisfies the threshold.

Some examples of the method 600 and the apparatus described herein may further include operations, features, means, or instructions for inputting the data and the parity information to error checking logic, where determining that the data includes one or more errors may be based on inputting the data and the parity information to the error checking logic, and inputting, after inverting the bit, the altered data and the parity information to the error checking logic, where determining whether the altered data includes a second set of one or more errors may be based on inputting the altered data and the parity information to the error checking logic.

Some examples of the method 600 and the apparatus described herein may further include operations, features, means, or instructions for determining, based on the procedure for error correction, that the data includes an error, identifying, among the set of memory cells, a respective memory cell associated with the error, and writing, to the cache, the indication that the respective memory cell may be defective based on determining that the data includes the error.

Some examples of the method 600 and the apparatus described herein may further include operations, features, means, or instructions for performing, prior to receiving the command, a diagnostic procedure for the memory array, and writing, to the cache, the indication that the memory cell may be defective based on the diagnostic procedure.

Some examples of the method 600 and the apparatus described herein may further include operations, features, means, or instructions for determining that the cache includes the indication that the memory cell may be defective, determining, based on the procedure for error correction, that no error is detected for the data, and removing the indication from the cache based on determining that no error is detected for the data.

In some examples of the method 600 and the apparatus described herein, the cache includes a second memory array, a portion of the memory array, or a combination thereof.

In some examples of the method 600 and the apparatus described herein, the cache includes an entry for the indicated address, the entry including the indication that the memory cell may be defective, and where the entry includes an address for the memory cell, an offset for the indicated address associated with the memory cell, an error count for the memory cell, metadata associated with the memory cell, or any combination thereof.

Figure 7:
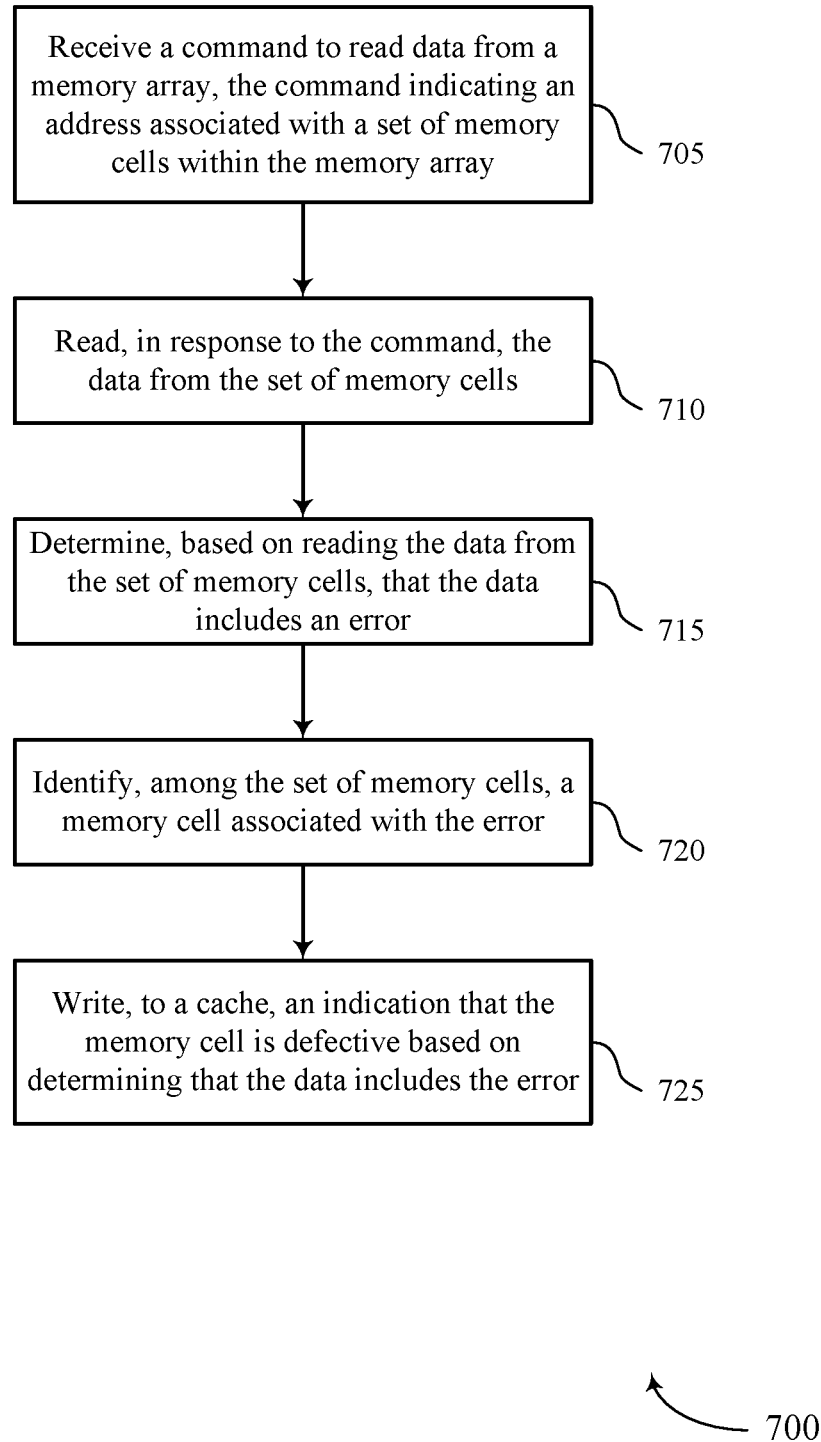

FIG. 7 shows a flowchart illustrating a method or methods 700 that supports error caching techniques for improved error correction in a memory device in accordance with aspects of the present disclosure. The operations of method 700 may be implemented by a memory device or its components as described herein. For example, the operations of method 700 may be performed by a memory device as described with reference to FIG. 5. In some examples, a memory device may execute a set of instructions to control the functional elements of the memory device to perform the described functions. Additionally or alternatively, a memory device may perform aspects of the described functions using special-purpose hardware.

At 705, the memory device may receive a command to read data from a memory array, the command indicating an address associated with a set of memory cells within the memory array. The operations of 705 may be performed according to the methods described herein. In some examples, aspects of the operations of 705 may be performed by a command receiver as described with reference to FIG. 5.

At 710, the memory device may read, in response to the command, the data from the set of memory cells. The operations of 710 may be performed according to the methods described herein. In some examples, aspects of the operations of 710 may be performed by a read component as described with reference to FIG. 5.

At 715, the memory device may determine, based on reading the data from the set of memory cells, that the data includes an error. The operations of 715 may be performed according to the methods described herein. In some examples, aspects of the operations of 715 may be performed by an error checking component as described with reference to FIG. 5.

At 720, the memory device may identify, among the set of memory cells, a memory cell associated with the error. The operations of 720 may be performed according to the methods described herein. In some examples, aspects of the operations of 720 may be performed by an error checking component as described with reference to FIG. 5.

At 725, the memory device may write, to a cache, an indication that the memory cell is defective based on determining that the data includes the error. The operations of 725 may be performed according to the methods described herein. In some examples, aspects of the operations of 725 may be performed by a cache component as described with reference to FIG. 5.

In some examples, an apparatus as described herein may perform a method or methods, such as the method 700. The apparatus may include features, means, or instructions (e.g., a non-transitory computer-readable medium storing instructions executable by a processor) for receiving a command to read data from a memory array, the command indicating an address associated with a set of memory cells within the memory array, reading, in response to the command, the data from the set of memory cells, determining, based on reading the data from the set of memory cells, that the data includes an error, identifying, among the set of memory cells, a memory cell associated with the error, and writing, to a cache, an indication that the memory cell is defective based on determining that the data includes the error.

Some examples of the method 700 and the apparatus described herein may further include operations, features, means, or instructions for incrementing an error count associated with the memory cell based on identifying the memory cell as associated with the error, where writing the indication to the cache may be based on the incremented error count satisfying a threshold.

Some examples of the method 700 and the apparatus described herein may further include operations, features, means, or instructions for receiving a second command to read second data from the set of memory cells, determining, in response to the second command, that the cache includes the indication that the memory cell may be defective, and performing, for the second data, a procedure for error correction that may be based on the cache including the indication.

In some examples of the method 700 and the apparatus described herein, performing the procedure for error correction may include operations, features, means, or instructions for determining that the second data includes one or more errors based on parity information for the second data, inverting, based on determining that the second data includes the one or more errors, a bit associated with the memory cell to obtain altered data, and correcting, after the inverting and based on the parity information, one or more errors in the altered data to obtain corrected data.

Some examples of the method 700 and the apparatus described herein may further include operations, features, means, or instructions for outputting, by a memory device that includes the memory array, the corrected data in response to the second command.

Some examples of the method 700 and the apparatus described herein may further include operations, features, means, or instructions for inputting the second data and the parity information to error checking logic, where determining that the second data includes the one or more errors may be based on inputting the second data and the parity information to the error checking logic, and inputting, after the inverting, the altered data and the parity information to the error checking logic, where correcting the one or more errors in the altered data may be based on inputting the altered data and the parity information to the error checking logic.

Some examples of the method 700 and the apparatus described herein may further include operations, features, means, or instructions for determining, based on the procedure for error correction, that no error is detected for the second data, and removing the indication from the cache based on determining that no error is detected for the second data.

In some examples of the method 700 and the apparatus described herein, the cache includes a second memory array, a portion of the memory array, or a combination thereof.

In some examples of the method 700 and the apparatus described herein, the cache includes an entry for the indicated address, the entry including the indication that the memory cell may be defective, and where the entry includes an address for the memory cell, an offset for the indicated address associated with the memory cell, an error count for the memory cell, metadata associated with the memory cell, or any combination thereof.

It should be noted that the methods described above describe possible implementations, and that the operations and the steps may be rearranged or otherwise modified and that other implementations are possible. Furthermore, portions from two or more of the methods may be combined.

An apparatus is described. The apparatus may include a memory array, a cache configured to store indications of defective memory cells within the memory array, and circuitry configured to cause the apparatus to receive a command to read data from the memory array, the command indicating an address associated with a set of memory cells within the memory array, read, in response to the command, the data from the set of memory cells, check, based on the indicated address, the cache for an indication that a memory cell of the set of memory cells is defective, and perform, for the data, a procedure for error correction that is based on whether the cache includes the indication.

Some examples of the apparatus may include error checking logic, where to perform the procedure for error correction, the circuitry may be further configured to cause the apparatus to input the data and parity information for the data into the error checking logic to determine whether the data includes one or more errors, invert, based at least in part on the cache including the indication and determining that the data includes one or more errors, a bit associated with the memory cell to obtain altered data, and input the altered data and the parity information into the error checking logic to determine whether the altered data includes a second set of one or more errors.

In some examples, the error checking logic is further configured to include correct at least one of the second set of one or more errors.

In some examples, the circuitry is further configured to cause the apparatus to determine that a quantity of errors included in the one or more errors satisfies a threshold, and invert the bit based at least in part on determining that the quantity of errors satisfies the threshold.

In some examples, the circuitry is further configured to cause the apparatus to receive, before the command, a prior command to read second data from the set of memory cells, determine that the second data includes an error associated with the memory cell, and update the cache to include the indication that the memory cell is defective based at least in part on determining that the second data includes the error.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are electrons), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

Computer-readable media includes both non-transitory computer storage media and communication media including any medium that facilitates transfer of a computer program from one place to another. A non-transitory storage medium may be any available medium that can be accessed by a general purpose or special purpose computer. By way of example, and not limitation, non-transitory computer-readable media can comprise RAM, ROM, electrically erasable programmable read only memory (EEPROM), compact disk (CD) ROM or other optical disk storage, magnetic disk storage or other magnetic storage devices, or any other non-transitory medium that can be used to carry or store desired program code means in the form of instructions or data structures and that can be accessed by a general-purpose or special-purpose computer, or a general-purpose or special-purpose processor. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, digital subscriber line (DSL), or wireless technologies such as infrared, radio, and microwave are included in the definition of medium. Disk and disc, as used herein, include CD, laser disc, optical disc, digital versatile disc (DVD), floppy disk and Blu-ray disc where disks usually reproduce data magnetically, while discs reproduce data optically with lasers. Combinations of the above are also included within the scope of computer-readable media.

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving a command to read data from a memory array, the command indicating an address associated with a set of memory cells within the memory array;
   reading, in response to the command, the data from the set of memory cells;
   determining, based at least in part on the indicated address, whether a cache includes an indication that a memory cell of the set of memory cells is defective; and
   performing, on the data read from the set of memory cells, a procedure for error correction that is based at least in part on whether the cache includes the indication.

2. The method of claim 1, further comprising:
   determining that the cache includes the indication, wherein performing the procedure for error correction comprises:
   determining that the data includes one or more errors based at least in part on the data and parity information associated with the data;
   inverting, based at least in part on the indication that the memory cell is defective and determining that the data includes the one or more errors, a bit associated with the memory cell to obtain altered data; and
   determining, after inverting the bit, whether the altered data includes a second set of one or more errors based at least in part on the altered data and the parity information.

3. The method of claim 2, further comprising:
   correcting, after inverting the bit, the second set of one or more errors based at least in part on the altered data and the parity information to obtain corrected data.

4. The method of claim 3, further comprising:
   outputting, by a memory device that includes the memory array, the corrected data in response to the command.

5. The method of claim 2, further comprising:
   determining that a quantity of errors included in the one or more errors satisfies a threshold, wherein inverting the bit is based at least in part on determining that the quantity of errors satisfies the threshold.

6. The method of claim 2, further comprising:
   inputting the data and the parity information to error checking logic, wherein determining that the data includes the one or more errors is based at least in part on inputting the data and the parity information to the error checking logic; and
   inputting, after inverting the bit, the altered data and the parity information to the error checking logic, wherein determining whether the altered data includes the second set of one or more errors is based at least in part on inputting the altered data and the parity information to the error checking logic.

7. The method of claim 1, further comprising:
   determining, based at least in part on the procedure for error correction, that the data includes an error;
   identifying, among the set of memory cells, a respective memory cell associated with the error; and
   writing, to the cache, the indication that the respective memory cell is defective based at least in part on determining that the data includes the error.

8. The method of claim 1, further comprising:
   performing, prior to receiving the command, a diagnostic procedure for the memory array; and
   writing, to the cache, the indication that the memory cell is defective based at least in part on the diagnostic procedure.

9. The method of claim 1, further comprising:
   determining that the cache includes the indication that the memory cell is defective;
   determining, based at least in part on the procedure for error correction, that no error is detected for the data; and
   removing the indication from the cache based at least in part on determining that no error is detected for the data.

10. The method of claim 1, wherein the cache comprises a second memory array, a portion of the memory array, or a combination thereof.

11. The method of claim 1, wherein the cache comprises an entry for the indicated address, the entry comprising the indication that the memory cell is defective, and wherein the entry comprises an address for the memory cell, an offset for the indicated address associated with the memory cell, an error count for the memory cell, metadata associated with the memory cell, or any combination thereof.

12. A method, comprising:
    receiving a command to read data from a memory array, the command indicating an address associated with a set of memory cells within the memory array;
    reading, in response to the command, the data from the set of memory cells;
    determining, based at least in part on reading the data from the set of memory cells, that the data read from the set of memory cells includes an error;
    identifying, among the set of memory cells, a memory cell associated with the error; and
    writing, to a cache, an indication that the memory cell is defective based at least in part on determining that the data read from the set of memory cells includes the error.

13. The method of claim 12, wherein the cache comprises a second memory array, a portion of the memory array, or a combination thereof.

14. The method of claim 12, wherein the cache comprises an entry for the indicated address, the entry comprising the indication that the memory cell is defective, and wherein the entry comprises an address for the memory cell, an offset for the indicated address associated with the memory cell, an error count for the memory cell, metadata associated with the memory cell, or any combination thereof.

15. A method, further comprising:
receiving a command to read data from a memory array, the command indicating an address associated with a set of memory cells within the memory array;
reading, in response to the command, the data from the set of memory cells;
determining, based at least in part on reading the data from the set of memory cells, that the data includes an error;
identifying, among the set of memory cells, a memory cell associated with the error;
incrementing an error count associated with the memory cell based at least in part on identifying the memory cell as associated with the error; and
writing, to a cache, an indication that the memory cell is defective based at least in part on determining that the data includes the error, wherein writing the indication to the cache is based at least in part on the incremented error count satisfying a threshold.

16. A method, further comprising:
receiving a command to read data from a memory array, the command indicating an address associated with a set of memory cells within the memory array;
reading, in response to the command, the data from the set of memory cells;
determining, based at least in part on reading the data from the set of memory cells, that the data includes an error;
identifying, among the set of memory cells, a memory cell associated with the error;
writing, to a cache, an indication that the memory cell is defective based at least in part on determining that the data includes the error;
receiving a second command to read second data from the set of memory cells;
determining, in response to the second command, that the cache includes the indication that the memory cell is defective; and
performing, for the second data, a procedure for error correction that is based at least in part on the cache including the indication.

17. The method of claim 16, wherein performing the procedure for error correction comprises:
determining that the second data includes one or more errors based at least in part on parity information for the second data;
inverting, based at least in part on determining that the second data includes the one or more errors, a bit associated with the memory cell to obtain altered data; and
correcting, after the inverting and based at least in part on the parity information, one or more errors in the altered data to obtain corrected data.

18. The method of claim 17, further comprising:
outputting, by a memory device that includes the memory array, the corrected data in response to the second command.

19. The method of claim 17, further comprising:
inputting the second data and the parity information to error checking logic, wherein determining that the second data includes the one or more errors is based at least in part on inputting the second data and the parity information to the error checking logic; and
inputting, after the inverting, the altered data and the parity information to the error checking logic, wherein correcting the one or more errors in the altered data is based at least in part on inputting the altered data and the parity information to the error checking logic.

20. The method of claim 16, further comprising:
determining, based at least in part on the procedure for error correction, that no error is detected for the second data; and
removing the indication from the cache based at least in part on determining that no error is detected for the second data.

21. An apparatus, the apparatus comprising:
a memory array,
a cache configured to store indications of defective memory cells within the memory array, and
circuitry configured to cause the apparatus to:
receive a command to read data from the memory array, the command indicating an address associated with a set of memory cells within the memory array;
read, in response to the command, the data from the set of memory cells;
check, based at least in part on the indicated address, the cache for an indication that a memory cell of the set of memory cells is defective; and
perform, on the data read from the set of memory cells, a procedure for error correction that is based at least in part on whether the cache includes the indication.

22. The apparatus of claim 21, further comprising:
error checking logic, wherein to perform the procedure for error correction, the circuitry is further configured to cause the apparatus to:
input the data and parity information for the data into the error checking logic to determine whether the data includes one or more errors;
invert, based at least in part on the cache including the indication and determining that the data includes one or more errors, a bit associated with the memory cell to obtain altered data; and
input the altered data and the parity information into the error checking logic to determine whether the altered data includes a second set of one or more errors.

23. The apparatus of claim 22, wherein the error checking logic is further configured to:
correct at least one of the second set of one or more errors.

24. The apparatus of claim 23, wherein circuitry is further configured to cause the apparatus to:
determine that a quantity of errors included in the one or more errors satisfies a threshold; and
invert the bit based at least in part on determining that the quantity of errors satisfies the threshold.

25. The apparatus of claim 23, wherein the circuitry is further configured to cause the apparatus to:
receive, before the command, a prior command to read second data from the set of memory cells;
determine that the second data includes an error associated with the memory cell; and
update the cache to include the indication that the memory cell is defective based at least in part on determining that the second data includes the error.

* * * * *